United States Patent
Kamiya et al.

(10) Patent No.: US 9,407,420 B2
(45) Date of Patent: Aug. 2, 2016

(54) INTER-VEHICLE COMMUNICATION SYSTEM AND INTER-VEHICLE COMMUNICATION DEVICE

(71) Applicant: DENSO CORPORATION, Kariya, Aichi-pref. (JP)

(72) Inventors: Yuuji Kamiya, Kariya (JP); Hidenori Akita, Chiryu (JP); Toshiya Saito, Hekinan (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 13/833,035

(22) Filed: Mar. 15, 2013

(65) Prior Publication Data

US 2014/0269604 A1 Sep. 18, 2014

(51) Int. Cl.
*H04L 5/00* (2006.01)
*H04W 72/04* (2009.01)

(52) U.S. Cl.
CPC ............ *H04L 5/0066* (2013.01); *H04L 5/0005* (2013.01); *H04L 5/0037* (2013.01); *H04W 72/048* (2013.01)

(58) Field of Classification Search
CPC .............................. H04L 5/0005; H04L 5/0066
See application file for complete search history.

(56) References Cited

U.S. PATENT DOCUMENTS

| 2008/0002564 | A1* | 1/2008 | Yu et al. ................... 370/203 |
| 2008/0009280 | A1* | 1/2008 | Ushiki et al. .............. 455/425 |
| 2011/0299487 | A1* | 12/2011 | Ito et al. ................... 370/329 |
| 2012/0314615 | A1* | 12/2012 | Nagai et al. ................ 370/252 |

FOREIGN PATENT DOCUMENTS

| JP | 2008-017318 | * | 1/2008 | ............... H04Q 7/36 |
| JP | 2008017318 | A | 1/2008 |
| JP | 2010-028636 | A | 2/2010 |

OTHER PUBLICATIONS

Office action mailed on Nov. 12, 2013 in the corresponding JP Application No. 2011-265134 (English Translation).

* cited by examiner

*Primary Examiner* — Jae Y Lee
(74) *Attorney, Agent, or Firm* — Posz Law Group, PLC

(57) ABSTRACT

An inter-vehicle communication device that is connected to a wide-area communication terminal determines a dedicated short-range communication resource assignment by using a wide-area communication resource assignment that is assigned to the wide-area communication terminal. Since a plurality of terminals are not assigned to the same resource block in the wide-area communication resource assignment, the dedicated short-range communication resource assignment determined by using the wide-area wireless communication resource assignment can also prevent a plurality of terminals from being assigned to the same time slot. The wide-area communication resource assignment is essentially necessary for the communication between a base station communication device and the terminals. Since the wide-area communication resource assignment which is necessary is used to determine the dedicated short-range communication resource assignment, a limit to the amount of downlink data can be reduced.

6 Claims, 16 Drawing Sheets

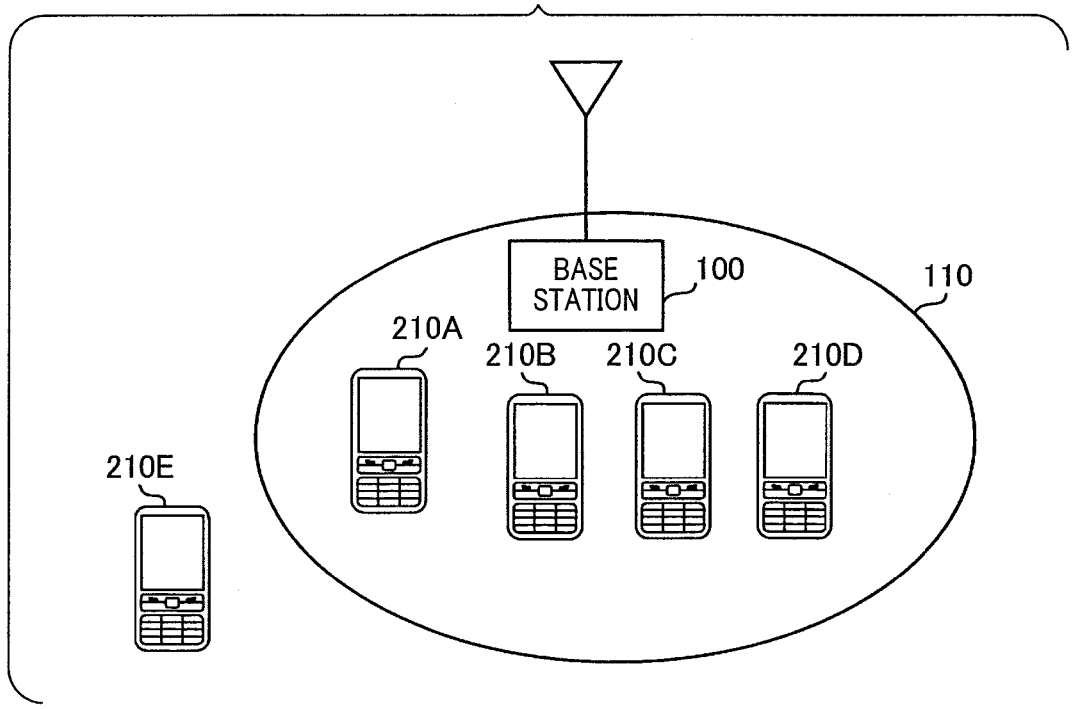

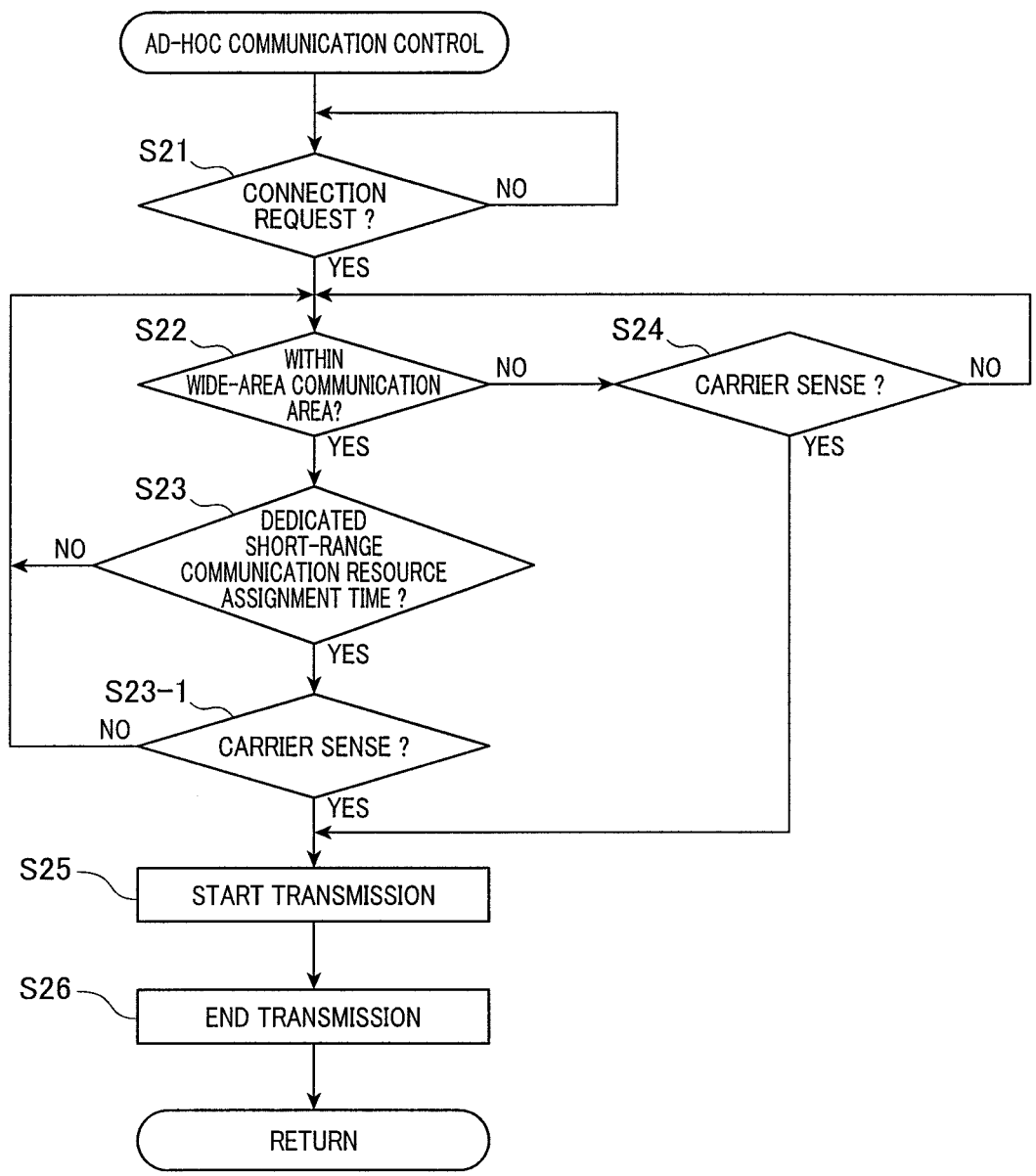

| TERMINAL NUMBER | UPDATE TIME |
|---|---|
| A | T1 |
| B | T2 |
| C | T3 |

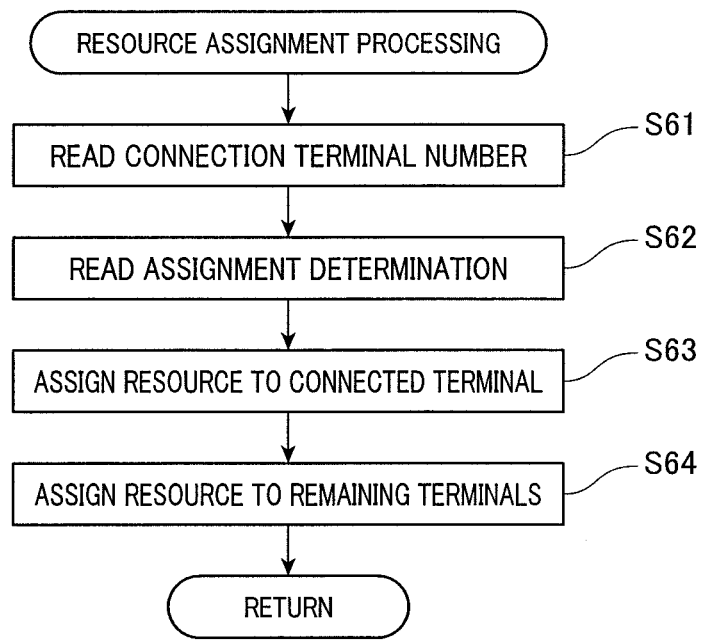
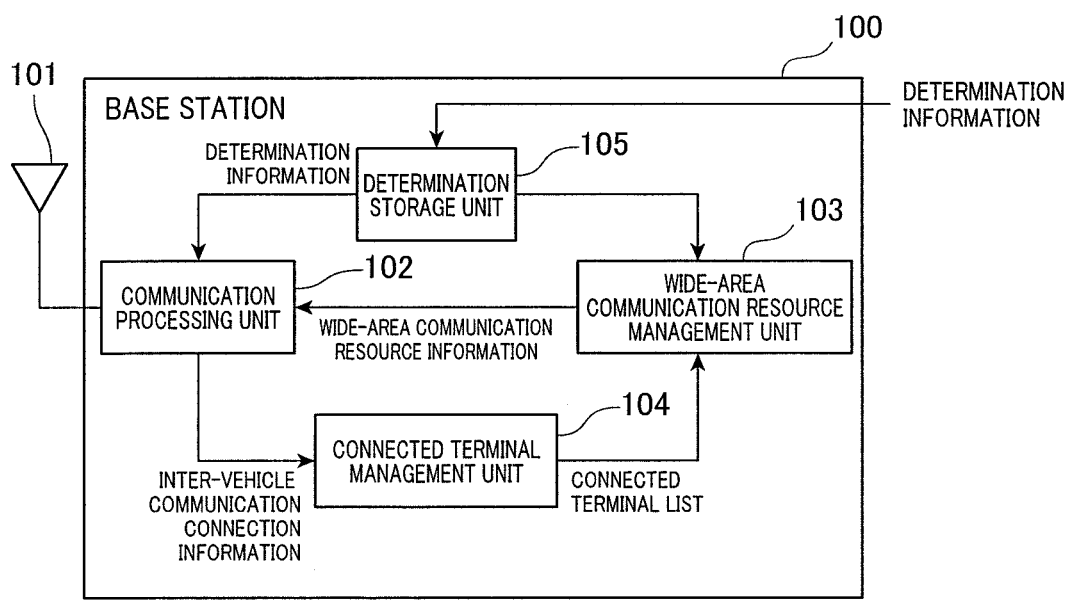

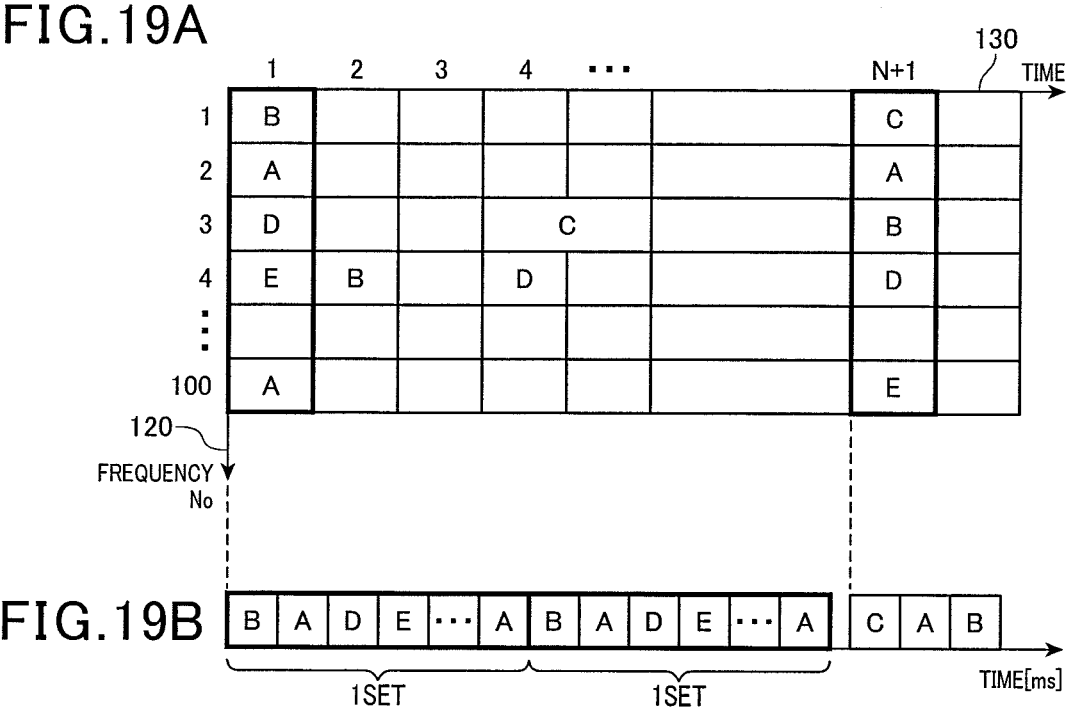

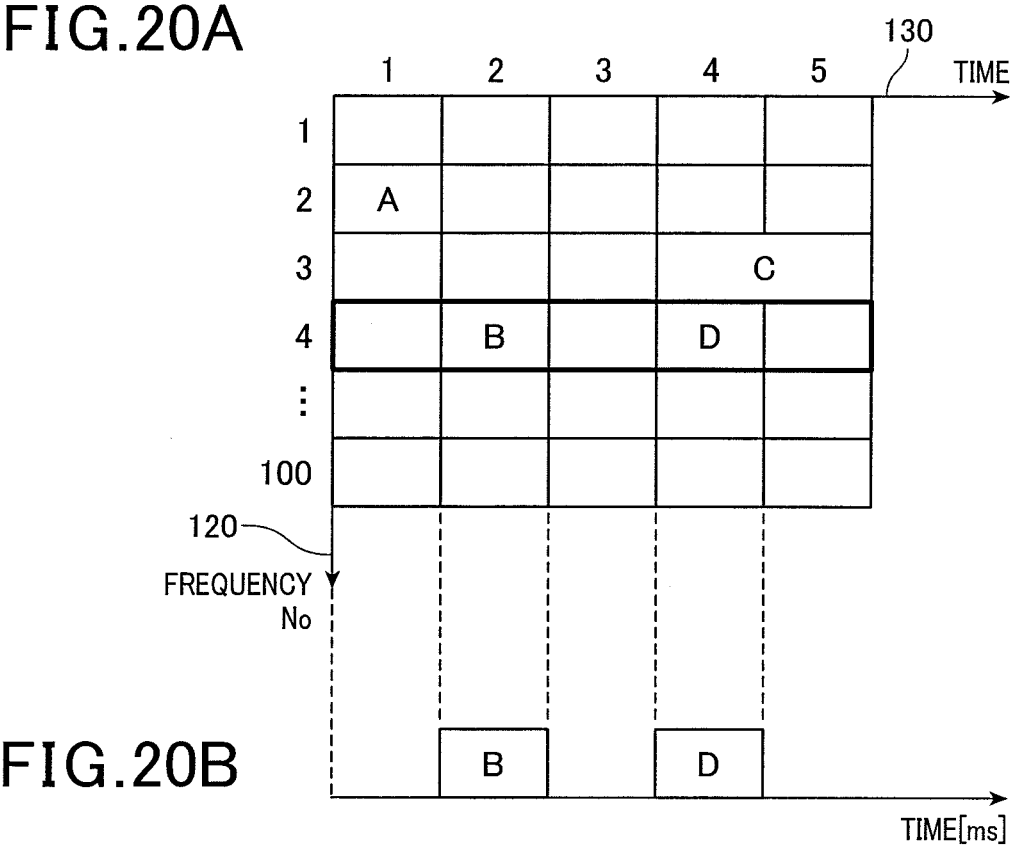

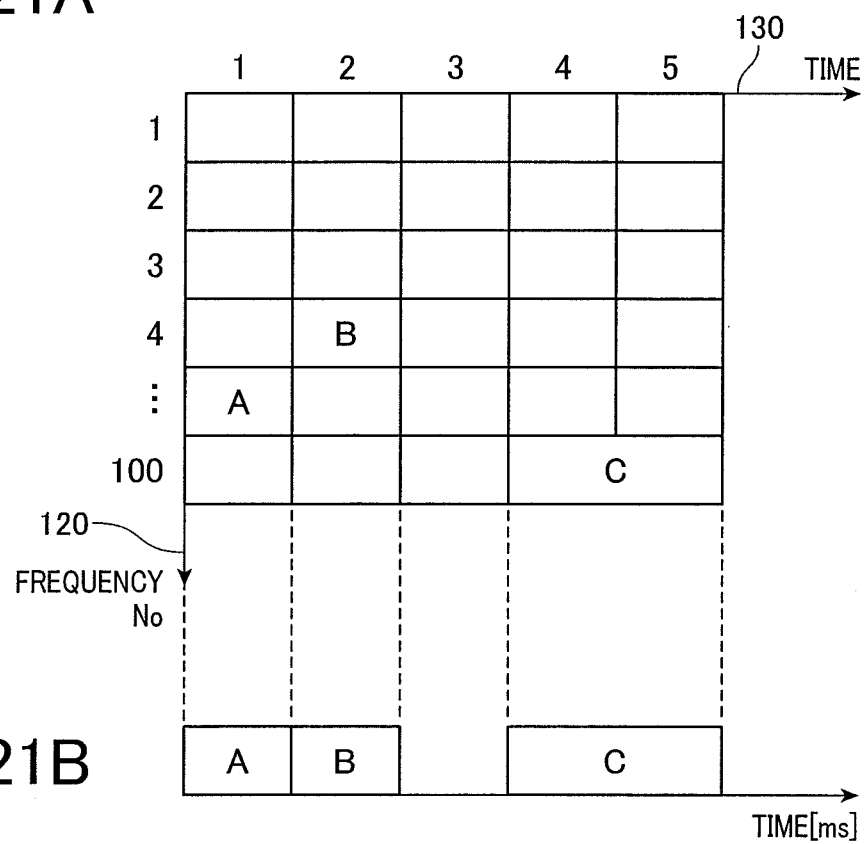

INTER-VEHICLE COMMUNICATION SYSTEM AND INTER-VEHICLE COMMUNICATION DEVICE

BACKGROUND

1. Technical Field

The present invention relates to an inter-vehicle communication system and an inter-vehicle communication device that constitutes the inter-vehicle communication system. More particularly, the present invention relates to a technique to improve communication quality of inter-vehicle communication.

2. Related Art

Inter-vehicle communication is a dedicated short-range ad-hoc communication technique in which an inter-vehicle communication device mounted on a vehicle directly communicates with other inter-vehicle communication devices mounted on other vehicle without using a base station. In inter-vehicle communication, when the inter-vehicle communication device detects another inter-vehicle communication device in the surrounding area is performing data transmission, the inter-vehicle communication device suspends its data transmission so as not to interfere with the transmitted data.

However, in a situation where the communication device (hereinafter, referred to as "inter-vehicle communication device A") fails to detect that other inter-vehicle communication device (hereinafter, referred to as "inter-vehicle communication device B") is transmitting data due to an obstacle such as a building, the inter-vehicle communication device A may perform data transmission. In such a situation, since data from the inter-vehicle communication devices A and B interfere with each other, an inter-vehicle communication device C that is located at a position capable of receiving data from both the inter-vehicle communication devices A and B may fail to receive both data. This situation is also called a hidden terminal problem in the sense that the inter-vehicle communication device B is not detected by (is hidden from) the inter-vehicle communication device A.

A mobile station disclosed in JP-A-2008-17318 includes a communication unit configured to perform dedicated short-range communication and a communication unit configured to perform communication with a base station handling wide-area infrastructure communication, and notifies its location to the base station via wide-area communication. When the base station receives the notification, the base station assigns a dedicated short-range ad-hoc communication resource to the mobile station and transmits the assigned information to the mobile station. The mobile station performs dedicated short-range communication based on the assigned dedicated short-range ad-hoc communication resource. As a result, simultaneous data transmission by a plurality of mobile station using dedicated short-range communication is avoided.

According to JP-A-2008-17318, the base station assigns the dedicated short-range ad-hoc communication resource, and the mobile station needs to sequentially receive the assignment of the dedicated short-range ad-hoc communication resource assigned by the base station. This causes a problem in that the amount of data transmitted in downlink from the base station to the mobile station decreases.

SUMMARY

Hence it is desired to provide an inter-vehicle communication system that is capable of reducing limit to the amount of downlink data from the wide-area communication base station to the mobile station and of preventing interference with the transmitted data during inter-vehicle communication, and an inter-vehicle communication device that constitutes the inter-vehicle communication system.

According to a first aspect, an inter-vehicle communication system including a plurality of mobile station communication devices that include a wide-area communication terminal and an inter-vehicle communication device that can be connected to the wide-area communication terminal, and a base station communication device that is capable of wide-area communication with the wide-area communication terminal. The base station communication device includes a wide-area resource transmission control unit which, sequentially, for example, determines a wide-area communication resource assignment and transmits the wide-area communication resource assignment to a plurality of the wide-area communication terminals that are located within a communication area of the base station communication device.

The wide-area communication terminal includes an assignment notification unit that notifies the inter-vehicle communication device that is in a connected state with the wide-area communication terminal of the wide-area communication resource assignment received from the base station communication device.

The inter-vehicle communication device includes an assignment obtaining unit that obtains the wide-area communication resource assignment from the wide-area communication terminal, a transmission timing determination unit that determines a transmission timing based on the wide-area communication resource assignment obtained by the assignment obtaining unit, and a data transmission control unit that performs data transmission based on the transmission timing determined by the transmission timing determination unit.

In the embodiment, although the base station communication device determines the wide-area communication resource assignment to the wide-area communication terminal and transmits the wide-area communication resource assignment to the wide-area communication terminal, the base station communication device does not determine the resource assignment to the inter-vehicle communication device. The inter-vehicle communication device obtains the wide-area communication resource assignment from the wide-area communication terminal, and determines a transmission timing based on the obtained wide-area communication resource assignment. It is essentially necessary for the communication between the base station communication device and the wide-area communication terminal that the base station communication device determines and transmits the wide-area communication resource assignment to the wide-area communication terminal. In the embodiment, the wide-area communication resource assignment which is essentially necessary is used by the inter-vehicle communication device to determine the transmission timing. Accordingly, a limit to the amount of downlink data from the base station communication device to the mobile station communication device can be reduced.

Further, the wide-area communication resource assignment is assigned so that a plurality of wide-area communication terminals can communicate with the same base station communication device, and the inter-vehicle communication device determines the transmission timing based on this wide-area communication resource assignment. Accordingly, it is possible to prevent interference with the transmitted data used in inter-vehicle communication.

A second exemplary embodiment is an inter-vehicle communication device of the inter-vehicle communication system according to the first exemplary embodiment.

BRIEF DESCRIPTION OF THE DRAWINGS

In the accompanying drawings:

FIG. 2 is a view which schematically shows four wide-area communication terminals that are located within a wide-area communication area;

FIG. 3 is an example of wide-area communication resource assignment of four wide-area communication terminals that are in a connected state as shown in FIG. 2.

FIG. 8 is a flow diagram of an ad-hoc communication control processing performed by the communication control unit of the inter-vehicle communication device in a second embodiment;

FIG. 16 is a flow diagram of a resource assignment processing performed by a wide-area communication resource management unit of the base station communication device in the fourth embodiment;

FIG. 17 is a block diagram which shows a configuration of the base station communication device in a fifth embodiment;

FIGS. 19A and 19B are views which show a dedicated short-range communication resource assignment determined by the communication control unit of the inter-vehicle communication device in a sixth embodiment;

FIGS. 20A and 20B are views which show a dedicated short-range communication resource assignment determined by the communication control unit of the inter-vehicle communication device in a seventh embodiment; and FIGS. 21A and 21B are views which show a dedicated short-range communication resource assignment determined by the communication control unit of the inter-vehicle communication device in an eighth embodiment;

DESCRIPTION OF EXEMPLARY EMBODIMENTS

With reference to the drawings, various embodiments of the invention will now be described.

First Embodiment

A first embodiment of the invention will now be described below with reference to the drawings.

Figure 1:
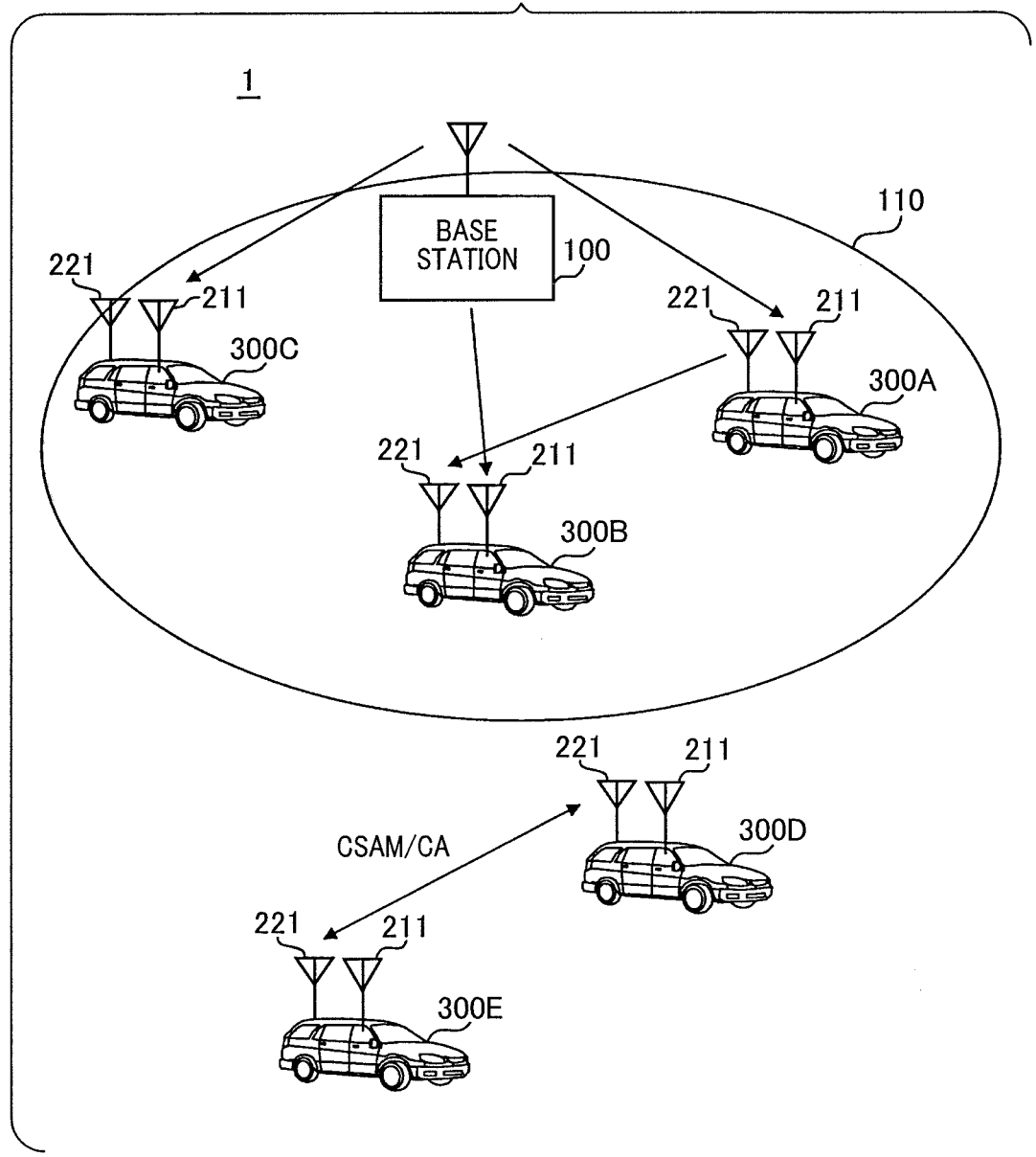
FIG. 1 is an overall configuration view of an embodiment of a wireless communication system 1 according to the invention.

FIG. 1 is an overall configuration view of a wireless communication system 1 which also serves as an inter-vehicle communication system according to the present invention. The wireless communication system 1 includes a base station communication device (hereinafter, simply referred to as "base station") 100 and a mobile station communication device (hereinafter, simply referred to as "mobile station") 200.

The mobile station 200 includes a mobile station wide-area communication antenna 211 and a mobile station inter-vehicle communication antenna 221. The antennas 211 and 221 are provided in a wide-area communication terminal 210 and an inter-vehicle communication device 220, respectively. The detail configurations of the wide-area communication terminal 210 and the inter-vehicle communication device 220 will be described later with reference to FIG. 5.

The base station 100 performs communication with each of the wide-area communication terminals 210 of the mobile stations 200 located within its own communication area, which is a wide-area communication area 110. In this communication, communication connection is performed in response to a connection request from the wide-area communication terminal 210, and a wide-area communication resource assignment is generated so that a communication resource block is assigned to each of the wide-area communication terminals 210 in a connected state. Then, the generated wide-area communication resource assignment is transmitted to the wide-area communication terminals 210. Each wide-area communication terminals 210 performs communication with the base station 100 by using the assigned resource block in the wide-area communication resource assignment.

The inter-vehicle communication device 220 of the mobile station 200 performs inter-vehicle communication with other inter-vehicle communication device 220 mounted on other vehicles 300. When the wide-area communication terminal 210 mounted on a vehicle such as vehicles 300A to 300C shown in FIG. 1 can receive the wide-area communication resource assignment, the wide-area communication resource assignment is received from the wide-area communication terminal 210 and the timing of inter-vehicle communication is determined based on the obtained wide-area communication resource assignment. On the other hand, when the wide-area communication terminal 210 is mounted on the vehicle such as vehicles 300D, 300E located outside the wide-area communication area 110, inter-vehicle communication is performed by carrier sense multiple access/collision avoidance (CSMA/CA).

FIG. 2 schematically shows four wide-area communication terminals 210A to 210D that are located within the wide-area communication area 110. Further, FIG. 2 also shows a wide-area communication terminal 210E located outside the wide-area communication area 110. The communication in the down direction from the base station 100 to the wide-area communication terminal 210 is performed by orthogonal frequency-division multiplexing (OFDM). In this method, the wide-area communication resource assignment is generated. For example, when four wide-area communication terminals 210A to 210D shown in FIG. 2 are simultaneously in a connected state with the base station 100, the base station 100 assigns communication resource blocks to the four wide-area communication terminals 210A to 210D. The wide-area communication terminal 210 is generally a cell phone as shown in FIG. 2.

FIG. 3 is an example of wide-area communication resource assignment of four wide-area communication terminals 210 that are in the connected state as shown in FIG. 2. As shown in FIG. 2, the wide-area communication resource assignment has a frequency block axis 120 and a time slot axis 130, and a plurality of resource blocks are segmented by frequency and time. One of the wide-area communication terminals 210 in the connected state is assigned to each resource block. The frequency block axis 120 indicates a frequency block number by which a frequency range used for communication is determined, while the time slot axis 130 indicates the number of the time slot.

Figure 4:
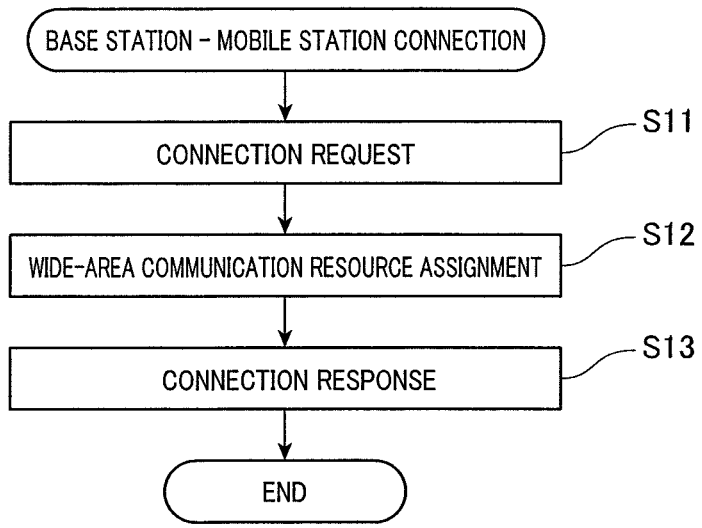
FIG. 4 is a flow diagram of a processing in which the wide-area communication resource assignment is notified to the wide-area communication terminal.

FIG. 4 is a flow diagram of a processing in which the wide-area communication resource assignment is notified to the wide-area communication terminal 210. In step S11, a connection request signal is transmitted from the wide-area communication terminal 210 to the base station 100. The wide-area communication terminal 210 constantly monitors a radio wave level received from the base station 100. When the radio wave level becomes equal to or higher than a predetermined value, the wide-area communication terminal 210 determines that it has entered the wide-area communication area 110 and transmits the connection request signal. The connection request signal contains a signal indicative of a request for connection with the base station 100 and terminal identification information of the wide-area communication terminal 210.

Step S12 is a process performed by the base station 100, in which the wide-area communication resource assignment is generated so that the resource blocks are assigned to all the wide-area communication terminals 210 in the connected state including the wide-area communication terminal 210 that has transmitted the connection request. In step S13, a connection response signal including wide-area communication resource information indicative of the wide-area communication resource assignment generated in step S12 is transmitted to the wide-area communication terminal 210 that has transmitted the connection request. Further, during the time period that the wide-area communication terminal 210 determines that it is located within the wide-area communication area 110, the wide-area communication terminal 210 periodically transmits signals indicating of being located within the wide-area communication area 110 to the base station 100. The base station 100 periodically transmits signals including wide-area communication resource information to the wide-area communication terminal 210 during a time period that the wide-area communication terminal 210 is located within its own wide-area communication area 110.

Figure 5:
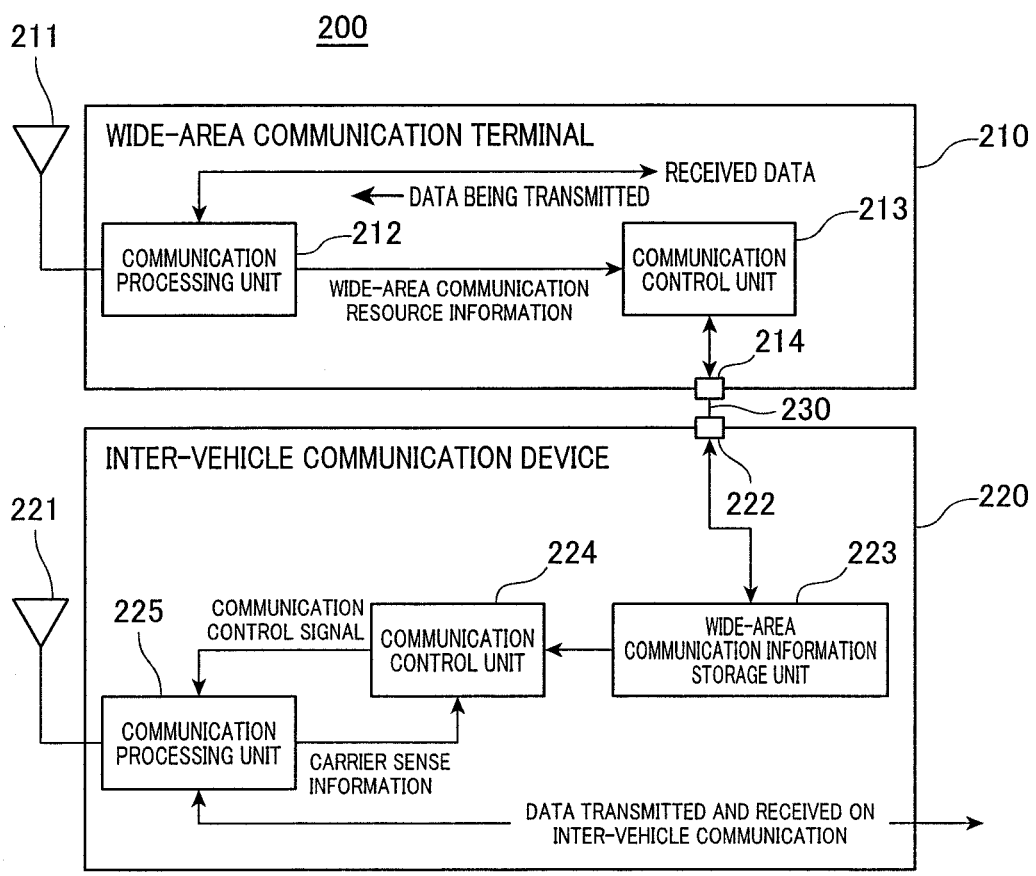
FIG. 5 is a block diagram which shows a configuration of a mobile station in a first embodiment.

FIG. 5 is a block diagram which shows a configuration of the mobile station 200. The mobile station 200 includes the wide-area communication terminal 210 and the inter-vehicle communication device 220.

The wide-area communication terminal 210 includes the mobile station wide-area communication antenna 211, a communication processing unit 212, a communication control unit 213 and a connector 214. The communication processing unit 212 includes a modulator, a demodulator, an amplifier, an encoder, a decoder, a signal holding unit and the like inside thereof, which is not shown in the figure. The communication processing unit 212 processes data received from the base station 100 and processes data to be transmitted to the base station 100. The received data are transmitted to an arithmetic unit, which is not shown in the figure, and the transmitted data are input to the communication processing unit 212 from the arithmetic unit. When the received data is the wide-area communication resource information, the wide-area communication resource information is transmitted also to the communication control unit 213.

When the communication control unit 213 receives the wide-area communication resource information, the communication control unit 213 transmits the wide-area communication resource information with the terminal identification information of its own terminal to the inter-vehicle communication device 220 via the connector 214 and the wiring 230. The wide-area communication terminal 210 may be wirelessly connected to the inter-vehicle communication device 220 instead of via the wiring 230.

A configuration of the inter-vehicle communication device 220 will be described. The inter-vehicle communication device 220 is a wireless device that performs dedicated short-range ad-hoc communication with other inter-vehicle communication devices 220 mounted on other vehicles, and includes the mobile station inter-vehicle communication antenna 221, a connector 222, a wide-area communication information storage unit 223, a communication control unit 224 and a communication control unit 225.

The connector 222 is connected to the connector 214 of the wide-area communication terminal 210 via the wiring 230. The wide-area communication information storage unit 223 is a storage unit configured to perform a storage processing, and stores the wide-area communication resource information transmitted from the communication control unit 213 of the wide-area communication terminal 210 in a sequential manner. The wide-area communication information storage unit 223 also stores the terminal identification information of the wide-area communication terminal 210.

The communication control unit 224 functions as both a transmission timing determination unit and a data transmission control unit, and determines whether or not the transmitted data are input to the communication processing unit 225 based on a signal from the communication processing unit 225. Further, the communication control unit 224 reads out the wide-area communication resource information from the wide-area communication information storage unit 223 in a sequential manner, and determines a dedicated short-range communication resource assignment that indicates a timing of transmission performed by the communication processing unit 225 based on the wide-area communication resource information and a carrier sense information provided from the communication processing unit 225. The communication control unit 224 instructs the communication processing unit 225 to transmit data according to the timing based on the assignment. The details of determination of the dedicated short-range communication resource assignment will be described later.

The communication processing unit 225 includes a modulator, a demodulator, an amplifier, an encoder, a decoder and the like inside thereof, which is not shown in the figures. The communication processing unit 225 processes data received from other inter-vehicle communication devices 220 and processes data to be transmitted to other inter-vehicle communication devices 220. The communication processing unit 225 receives data to be transmitted via inter-vehicle communication from other devices in a sequential manner and transmits those data with a transmission timing determined by a communication control signal. Further, data received from other inter-vehicle communication devices 220 are transmitted to other devices in the vehicle, such as a vehicle controller and a navigation device. The communication processing unit 225 implements carrier sense multiple access/collision avoidance (CSMA/CA) according to the instruction from the communication control unit 224 and transmits carrier sense information indicative of the results of CSMA/CA to the communication control unit 224.

Figure 6A:
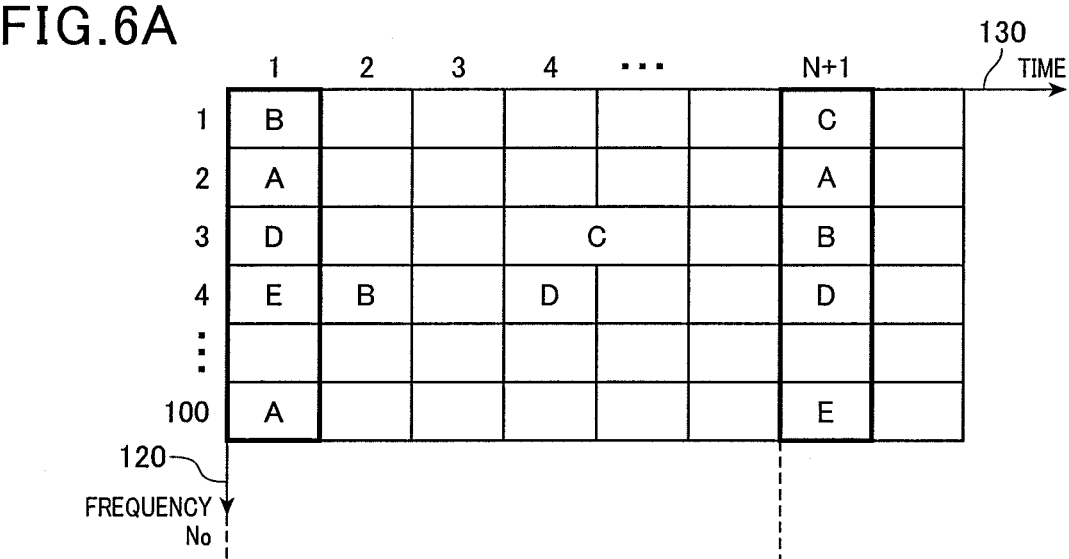
FIGS. 6A and 6B are views which show a dedicated short-range communication resource assignment determined by a communication control unit of an inter-vehicle communication device in the first embodiment.
Figure 6B:
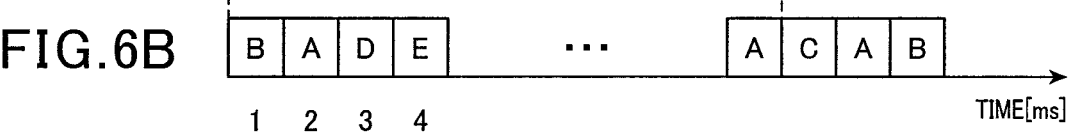

FIGS. 6A and 6B are views which show a dedicated short-range communication resource assignment determined by the communication control unit 224. FIG. 6A is an example of wide-area communication resource assignment, and FIG. 6B is an example of dedicated short-range communication resource assignment.

In the example shown in FIGS. 6A and 6B, one time slot of the wide-area communication resource assignment is used to determine one dedicated short-range communication resource assignment. Specifically, in the example of FIGS. 6A and 6B, assignment of time slot 1 is used to determine the first dedicated short-range communication resource assignment. The wide-area communication terminals 210 assigned to the frequency blocks of the time slot 1 in the order from the lowest to highest frequencies are assigned to the time slots of the dedicated short-range communication resource assignment in the order from the lowest to highest time slot numbers. Accordingly, "B", "A", "D", "E" which are assigned to the frequency blocks 1, 2, 3, 4 of the time slot 1 of FIG. 6A are assigned to the time slots 1, 2, 3, 4 of FIG. 6B, respectively.

Further, in the example shown in FIGS. 6A and 6B, an update cycle in which the dedicated short-range communication resource assignment is updated is N time slots of the wide-area communication resource assignments. The time period of the update cycle divided by the number of frequency blocks is a length of a unit time slot of the dedicated short-range communication resource assignment. The time slot N+1 in FIG. 6A is used to update the dedicated short-range communication resource assignment for the time slot N+1 and thereafter.

Figure 7:
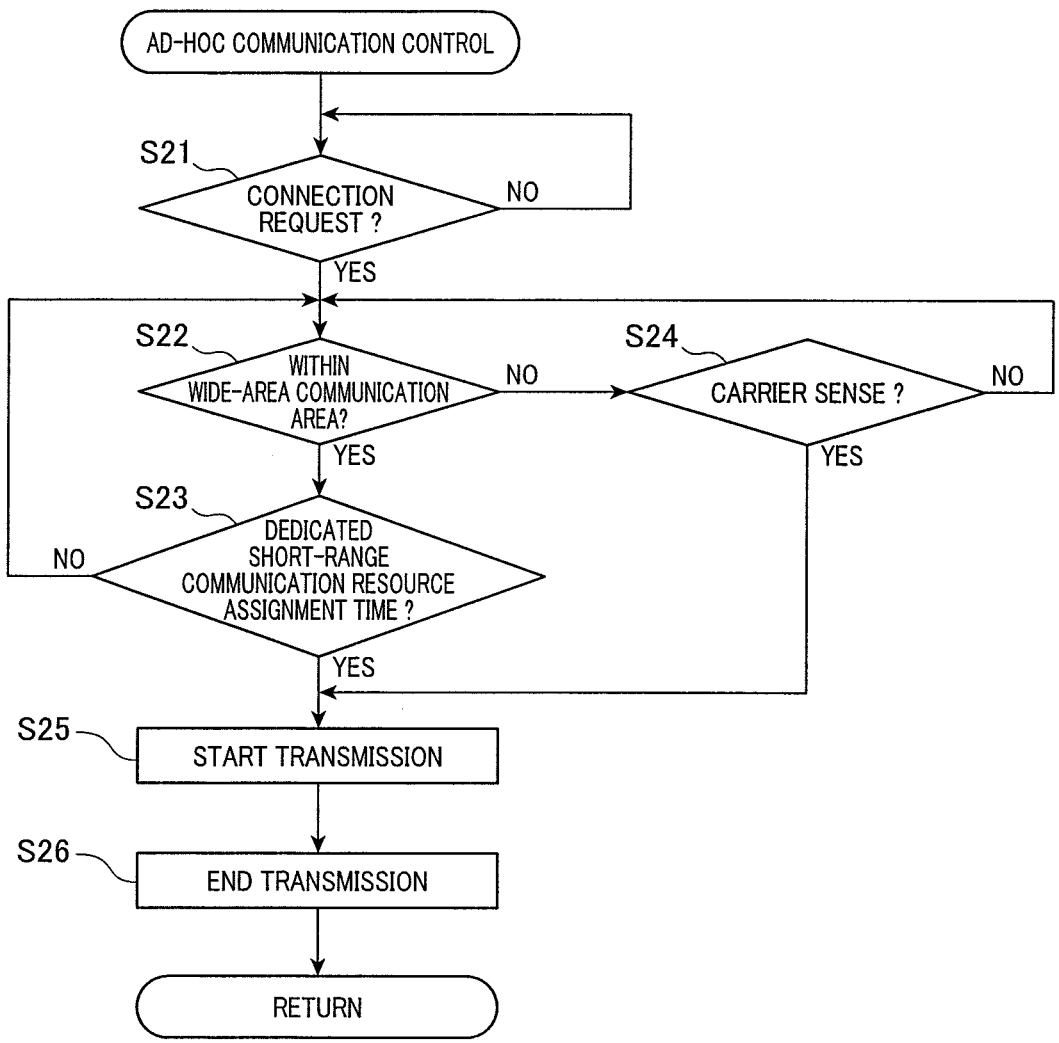
FIG. 7 is a flow diagram of an ad-hoc communication control processing performed by the communication control unit of the inter-vehicle communication device.

FIG. 7 is a flow diagram of an ad-hoc communication control processing performed by the communication control unit 224 of the inter-vehicle communication device 220. In step S21, whether or not there is a communication request is determined based on whether or not the transmitted data have been input to the communication processing unit 225. If the result of step S21 is NO, step S21 is repeated. If the result of step S21 is YES, the process proceeds to step S22.

In step S22, whether the inter-vehicle communication device 220 is located within a wide-area communication area 110 or not is determined. When the inter-vehicle communication device 220 is located within a wide-area communication area 110, the wide-area communication resource information is transmitted from the wide-area communication terminal 210 and stored in the wide-area communication information storage unit 223. In step S22, whether the wide-area communication terminal 210 is located within the wide-area communication area 110 or not is determined based on whether or not the wide-area communication resource information including a current time assignment is stored in the wide-area communication information storage unit 223. If the result of step S22 is YES, the process proceeds to step S23. In step S23, whether the current time is a time assigned to the wide-area communication terminal 210 in the connected state with the inter-vehicle communication device 220 in the dedicated short-range communication resource assignment or not is determined. The communication control unit 224 sequentially or periodically obtains a new wide-area communication resource assignment when the wide-area communication terminal 210 is located within the wide-area communication area 110, and sequentially or periodically updates the dedicated short-range communication resource assignment based on the obtained wide-area communication resource assignment.

If the result of step S23 is NO, the process returns to step S22. If the result of step S23 is YES, the process proceeds to step S25 where transmission of data starts, and then step S26 where transmission of data is completed.

If the result of step S22 is NO, that is, when the wide-area communication terminal 210 is located outside the wide-area communication area 110, the dedicated short-range communication resource assignment is not generated. In step S24, carrier sense is performed to check whether the communication channel for inter-vehicle communication is available. If it is determined that the communication channel is not available (S24: NO), the process returns to step S22. If it is determined that communication channel is available (S24: YES), the process proceeds to step S25 where transmission of data starts, and then step S26 where transmission of data is completed. After step S26, the process returns to step S21.

According to the above described first embodiment, the inter-vehicle communication device 220 that is connected to the wide-area communication terminal 210 determines the dedicated short-range communication resource assignment by using the wide-area communication resource assignment assigned to the wide-area communication terminal 210. More specifically, the wide-area communication terminals 210 assigned to the frequency blocks of a time slot of the wide-area communication resource assignment in the order from the lowest to highest numbers are assigned to the time slots of the dedicated short-range communication resource assignment in the order from the lowest to highest numbers. Since a plurality of wide-area communication terminals 210 are not assigned to the same resource block in the wide-area communication resource assignment, the dedicated short-range communication resource assignment determined by using the wide-area wireless communication resource assignment can also prevent a plurality of wide-area communication terminals 210 from being assigned to the same time slot. Accordingly, it is possible to prevent the transmission timings of a plurality of inter-vehicle communication devices 220 from overlapping each other.

Further, it is essential for the communication between the base station 100 and the wide-area communication terminals 210 that the base station 100 determines and transmits the wide-area communication resource assignment to the wide-area communication terminal 210. In the first embodiment, the wide-area communication resource assignment which is essentially necessary is used to determine the dedicated short-range communication resource assignment. Accordingly, a limit to the amount of downlink data transmitted from the base station 100 to the mobile station 200 can be reduced.

According to the first embodiment, when the inter-vehicle communication device 220 is located outside a wide-area communication area 110 (S22: NO), carrier sense is performed to check whether the communication channel is available. If it is determined that the communication channel is available (S24: YES), data transmission is performed. Accordingly, it is possible to prevent the transmission timings of a plurality of inter-vehicle communication devices 220 from overlapping each other even when inter-vehicle communication device 220 is located outside the wide-area communication area 110.

Second Embodiment

A second embodiment will be described below. In the description of the second embodiment and subsequent embodiments, the same or similar components are denoted by the same reference numerals as those of the first embodiment, and the description thereof will be omitted or simplified.

In the second embodiment, the communication control unit 224 of the inter-vehicle communication device 220 performs a process shown in FIG. 8 instead of the processing shown in FIG. 7. The processing shown in FIG. 8 differs from the processing shown in FIG. 7 in that step S23-1 is added after step S23. The remaining is the same as FIG. 7.

As shown in FIG. 8, even if the time is determined as a dedicated short-range communication resource assignment time in step S23, data are not transmitted. Then, in step S23-1, carrier sense is performed to check whether the communication channel of the inter-vehicle communication is available or not. If it is determined that the communication channel is available (S23-1: YES), the process proceeds to step S25 where data transmission starts, and to step S26 where data transmission is completed. If it is determined that the communication channel is not available (S23-1: NO), data are not transmitted and the process returns to step S22.

Not all the mobile stations 200 have a pair of the wide-area communication terminal 210 and the inter-vehicle communication device 220. That is, not all the inter-vehicle communication devices 220 are connected to the wide-area communication terminals 210. Some inter-vehicle communication devices 220 may not determine the dedicated short-range communication resource assignment by using the wide-area communication resource assignment. Such inter-vehicle communication devices 220 perform data transmission without taking into consideration the transmission timings of other inter-vehicle communication devices 220. Moreover, even if the inter-vehicle communication device 220 is located outside the wide-area communication area 110, the inter-vehicle communication device 220 can perform inter-vehicle communication with the inter-vehicle communication devices 220 that are located within the wide-area communication area 110 in the case where it is located close to the wide-area communication area 110. The timings at which those inter-vehicle communication devices 220 transmit data are independent from the wide-area communication resource assignment. Accordingly, even if the inter-vehicle communication device 220 determines the dedicated short-range communication resource assignment based on the wide-area communication resource assignment, there is a risk of overlapping of transmission timings with the inter-vehicle communication device 220 that determines the transmission timing independently from the wide-area communication resource assignment.

In the second embodiment, even if the time is determined as the dedicated short-range communication resource assignment time, carrier sense is performed. As a result, it is possible to reduce overlapping of transmission timings with inter-vehicle communication devices 220 that determine the transmission timing independently from the wide-area communication resource assignment.

Third Embodiment

A third embodiment will be described below. Although the inter-vehicle communication device 220 in the first embodiment has a single communication channel, the inter-vehicle communication device 220 in the third embodiment has two communication channels.

Figure 9A:
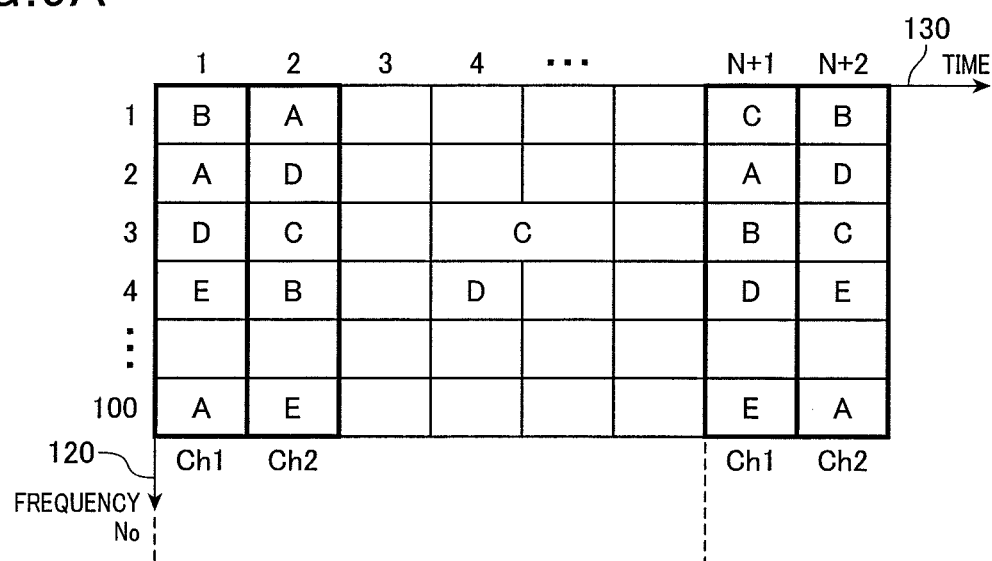
FIGS. 9A and 9B are views which show a dedicated short-range communication resource assignment determined by the communication control unit of the inter-vehicle communication device in a third embodiment.
Figure 9B:
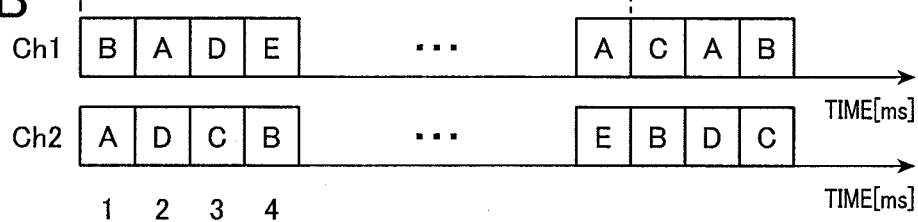

FIGS. 9A and 9B are views which show a dedicated short-range communication resource assignment determined by the communication control unit 224 in the third embodiment. FIG. 9A is an example of wide-area communication resource assignment, and FIG. 9B is an example of dedicated short-range communication resource assignment.

As shown in FIGS. 9A and 9B, the time slot 1 of the wide-area communication resource assignment is used to determine an assignment of channel 1 of the dedicated short-range communication resource assignment. Further, the time slot 2 of the wide-area communication resource assignment is used to determine an assignment of channel 2 of the dedicated short-range communication resource assignment.

In the third embodiment, the time slots corresponding to the number of channels in the inter-vehicle communication device 220 are used from the wide-area communication resource assignment. Accordingly, in the case where the inter-vehicle communication device 220 has a plurality of channels, transmission timing that does not overlap with that of other inter-vehicle communication device 220 can be determined for the plurality of channels.

Fourth Embodiment

A fourth embodiment will be described below.

Figures 10, 11:
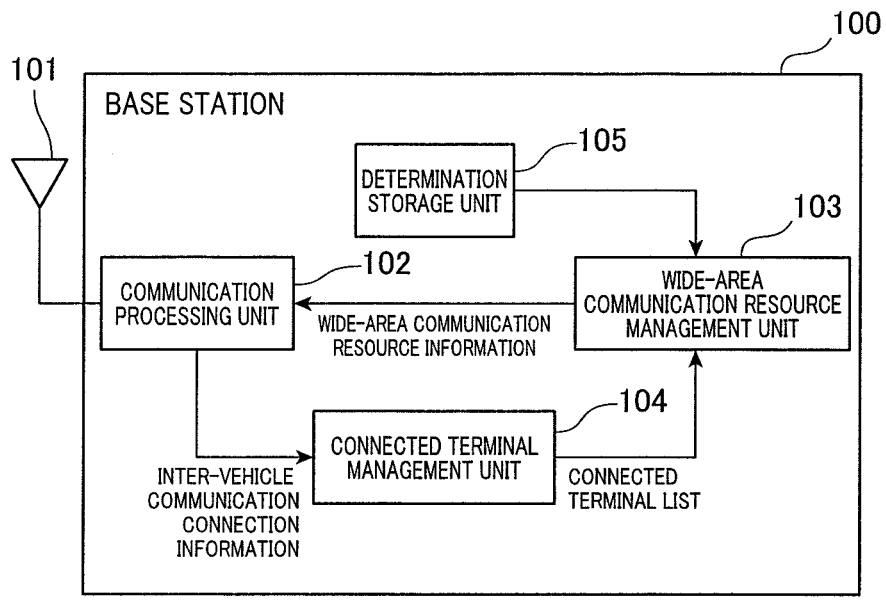
FIG. 10 is a block diagram which shows a configuration of a base station communication device in a fourth embodiment.
FIG. 11 is an example of a connected terminal list in a fourth embodiment.

FIG. 10 is a block diagram which shows a configuration of the base station 100 in the fourth embodiment. The base station 100 includes a base station wide-area communication antenna 101, a communication processing unit 102, a wide-area communication resource management unit 103, a connected terminal management unit 104 and a determination storage unit 105.

The communication processing unit 102 includes a modulator, a demodulator, an amplifier, an encoder, a decoder and the like inside thereof, which is not shown in the figure. The communication processing unit 102 transmits and receives data to and from the wide-area communication terminal 210 of the mobile station 200 via the base station wide-area communication antenna 101. The data to be transmitted from the communication processing unit 102 includes, for example, the connection response signal which is described above. The data to be received from the wide-area communication terminal 210 includes, for example, the connection request signal which is described above and inter-vehicle communication connection information.

The inter-vehicle communication connection information is information that indicates that the wide-area communication terminal 210 is in the connected state with the inter-vehicle communication device 220 and includes a terminal number of the wide-area communication terminal 210 as terminal identification information. The inter-vehicle communication connection information received by the communication processing unit 102 is transmitted to the connected terminal management unit 104.

The connected terminal management unit 104 performs an update processing of the connected terminal list based on the inter-vehicle communication connection information. The connected terminal list is a list of the wide-area communication terminals 210 that are connected to the inter-vehicle communication devices 220 and located within the wide-area communication area.

FIG. 11 is an example of the connected terminal list and includes the terminal number of the wide-area communication terminals 210 that are currently in the connected state with the inter-vehicle communication device 220 and a time when the list is updated after receiving the inter-vehicle communication connection information from the wide-area communication terminal 210 of the terminal number.

The determination storage unit 105 corresponds to a base station storage unit in claims, and stores an assignment determination for determining where the resource block of the wide-area communication terminal 210 in the connected state with the inter-vehicle communication device 220 is preferentially assigned. The assignment determination herein is assumed to be a determination of a time slot.

The wide-area communication resource management unit 103 functions as a wide-area resource transmission control unit. The wide-area communication resource management unit 103 performs a determination process to sequentially or periodically determine the above-mentioned wide-area communication resource assignment. In the determination process, the assignment determination is read out from the determination storage unit 105. Further, the connected terminal list is obtained from the connected terminal management unit 104. A resource block of the time slot which is determined by the assignment determination read out from the determination storage unit 105 is preferentially assigned to the wide-area communication terminal 210 whose terminal number is listed in the connected terminal list. The wide-area communication resource information indicative of the wide-area communication resource assignment is transmitted to the communication processing unit 102, and transmitted to the wide-area communication terminal 210 via the communication processing unit 102 and the base station wide-area communication antenna 101.

Figure 12:
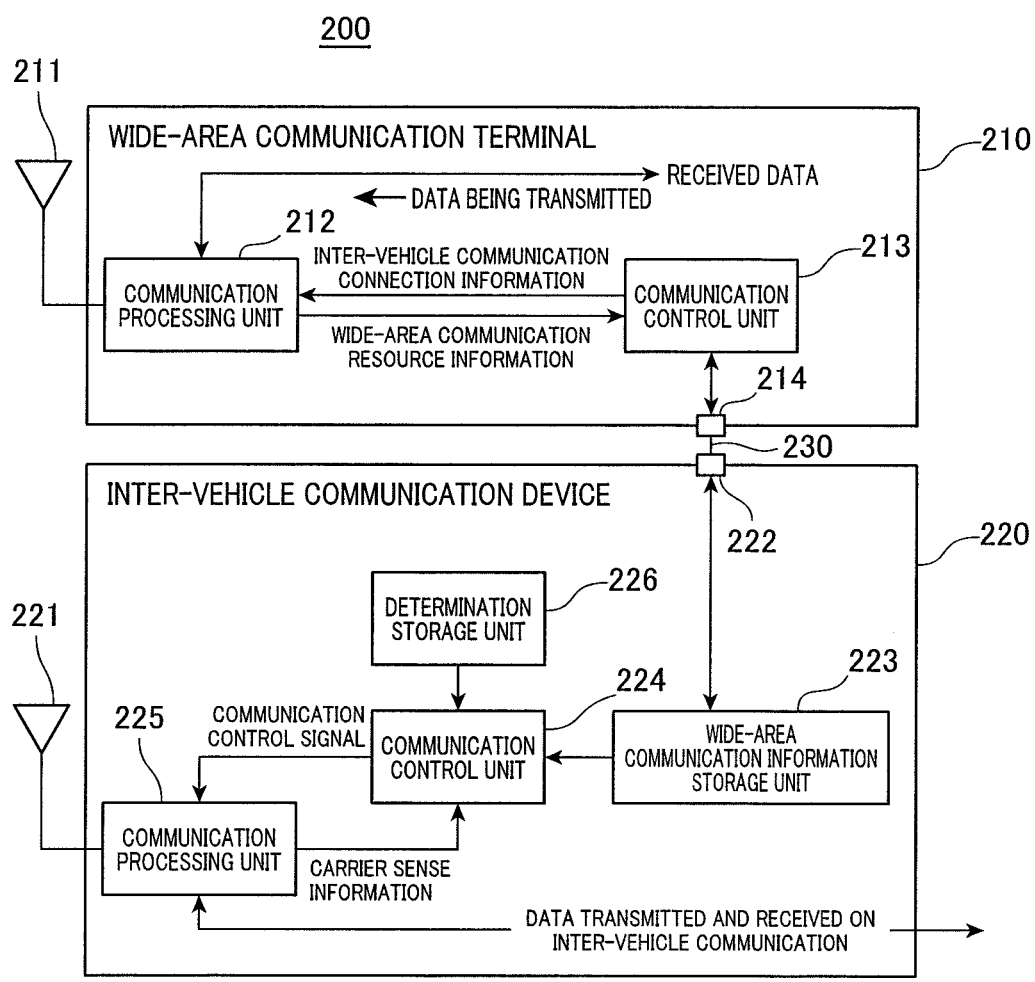
FIG. 12 is a block diagram which shows a configuration of the mobile station in the fourth embodiment.

FIG. 12 is a block diagram which shows a configuration of the mobile station 200 in the fourth embodiment. The mobile station 200 of the fourth embodiment differs from that of the first embodiment in that the inter-vehicle communication device 220 includes a determination storage unit 226, and that the wide-area communication terminal 210 transmits the inter-vehicle communication connection information to the base station 100.

In the fourth embodiment, when detecting that the wide-area communication terminal 210 is in the connected state with the inter-vehicle communication device 220, the communication control unit 213 of the wide-area communication terminal 210 periodically transmits the inter-vehicle communication connection information indicative of the connection to the communication processing unit 212. The communication processing unit 212 transmits the inter-vehicle communication connection information to the base station 100 via the mobile station wide-area communication antenna 211.

Similarly to the first embodiment, on receiving the wide-area communication resource information, the communication processing unit 212 transmits the wide-area communication resource information to the communication control unit 213. Then, the communication control unit 213 transmits the wide-area communication resource information to the inter-vehicle communication device 220.

In the inter-vehicle communication device 220, the wide-area communication resource information is stored in the wide-area communication information storage unit 223. When determining the dedicated short-range communication resource assignment, the communication control unit 224 uses the wide-area communication resource information stored in the wide-area communication information storage unit 223, as similar to the first embodiment. In the fourth embodiment, the communication control unit 224 further refers to the assignment determination that is stored in the determination storage unit 226. This assignment determination is the same as that is stored in the determination storage unit 105 of the base station 100. The assignment determinations of determination storage units 105 and 226 are pre-stored at the time of manufacturing. The communication control unit 224 refers to the time slot that is determined based on the assignment determination obtained from the determination storage unit 226 in the wide-area communication resource assignments obtained from the wide-area communication information storage unit 223, and determines the dedicated short-range communication resource assignment in the same manner as that of the first embodiment. After the dedicated short-range communication resource assignment is determined, the process proceeds in the same manner as in the first embodiment.

Figure 13:
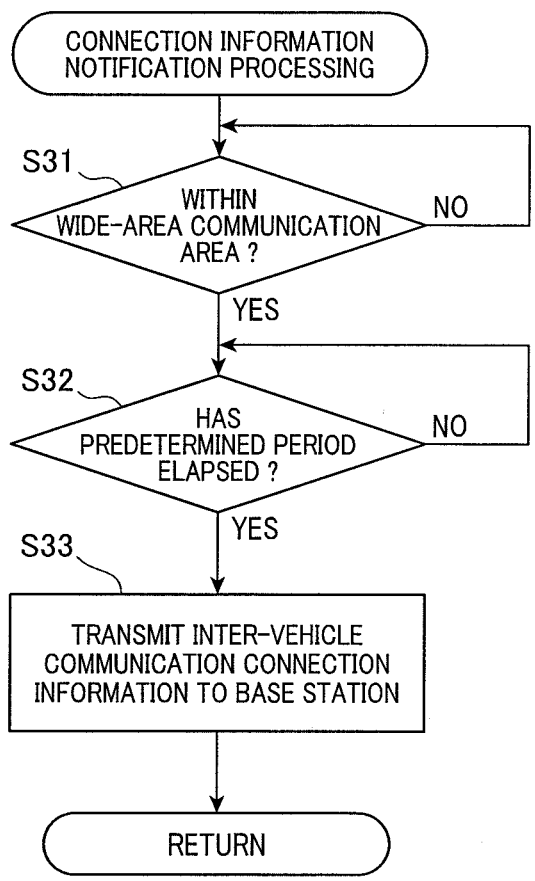
FIG. 13 is a flow diagram of a connection information notification processing performed by a communication control unit of the wide-area communication terminal in the fourth embodiment.

FIG. 13 is a flow diagram of a connection information notification process performed by a communication control unit 213 of the wide-area communication terminal 210. During the time period in which the communication control unit 213 detects that the inter-vehicle communication device 220 is in the connected state, the communication control unit 213 periodically performs the connection information notification processing, thereby transmitting the inter-vehicle communication connection information to the base station 100.

In step S31, whether or not the wide-area communication terminal 210 is located within the wide-area communication area 110 is determined. Details of this determination are the same as those of step S22 in FIG. 8. If the result of step S31 is NO, the determination in step S31 is repeated. If the result of step S31 is YES, the process proceeds to step S32.

In step S32, whether or not a predetermined period of time has elapsed after the inter-vehicle communication connection information is transmitted is determined. If the result of step S32 is NO, step S32 is repeated. If the result of step S32 is YES, the process proceeds to step S33, and the inter-vehicle communication connection information is transmitted to the base station 100.

Figure 14:
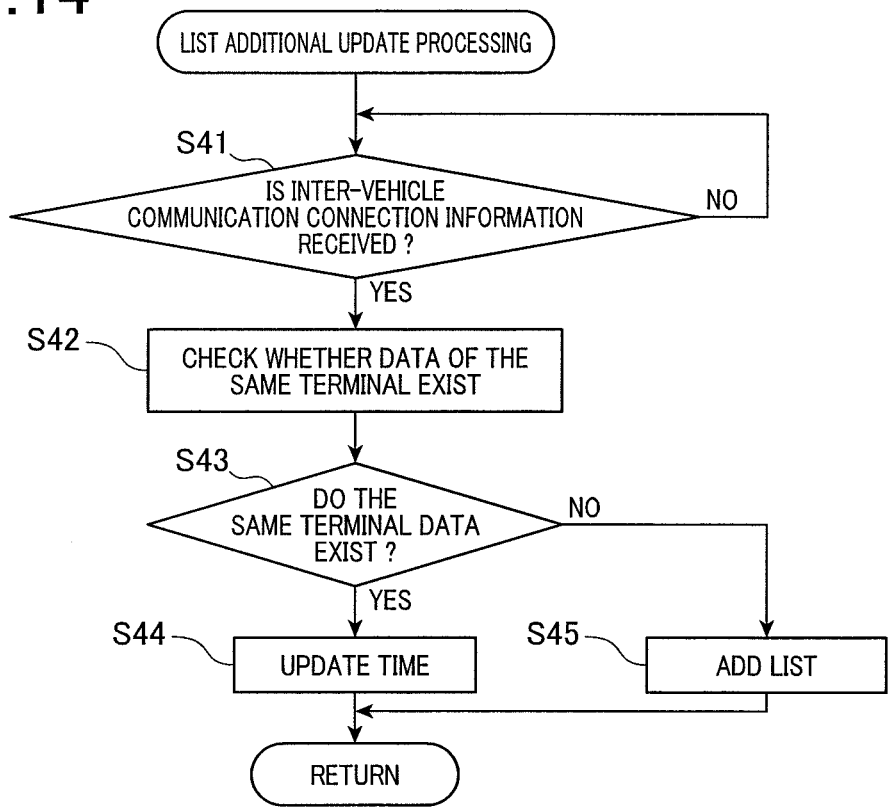
FIG. 14 is a flow diagram of an additional update processing of the connected terminal list performed by a connected terminal management unit of the base station communication device in the fourth embodiment.

FIG. 14 is a flow diagram of an additional update processing of the connected terminal list performed by a connected terminal management unit 104 of the base station 100. In step S41, whether or not any inter-vehicle communication connection information has been received is determined. If the result of step S41 is NO, step S41 is repeated. If the result of step S41 is YES, the process proceeds to step S42. In step S42, whether or not data of the same terminal as that indicated in the inter-vehicle communication connection information exists in the connected terminal list is checked.

In step S43, whether or not the result of the check in step S42 shows that data of the same terminal exist is determined. If data of the same terminal exists (S43:YES), the update time shown in FIG. 11 is updated to the current time in step S44. If the result of step S43 is NO, the process proceeds to step S45. In this case, the terminal number included in the inter-vehicle communication connection information that is determined as having been received in step S41 is added to the connected terminal list, and the update time of the terminal number is defined as the current time. After steps S44, S45 are executed, the process returns to step S41.

Figure 15:
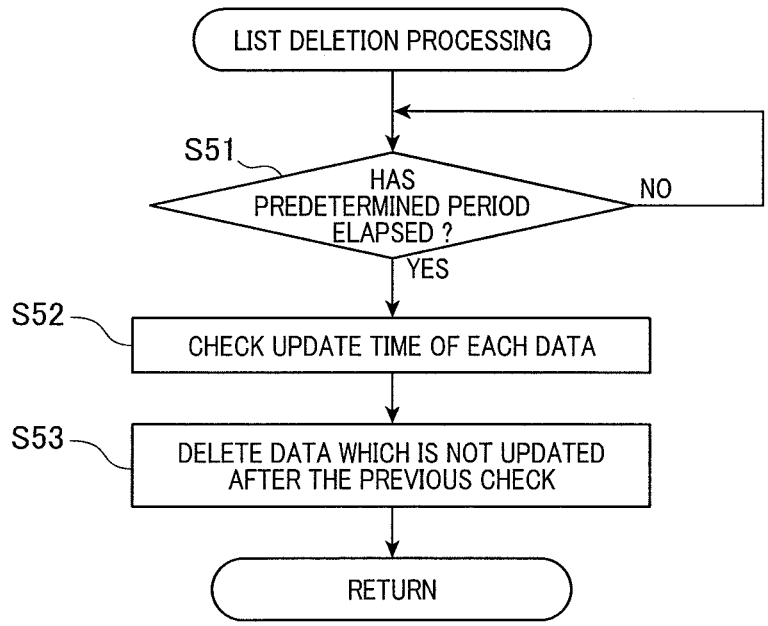
FIG. 15 is a flow diagram of a deletion processing of the connected terminal list performed by the connected terminal management unit of the base station communication device in the fourth embodiment.

FIG. 15 is a flow diagram of a deletion processing of the connected terminal list performed by the connected terminal management unit 104 of the base station 100. In step S51, whether a predetermined period of time has elapsed or not after the previous update check of the connected terminal list is conducted. The predetermined period of time is defined as a cycle which is longer than the transmitting cycle of the inter-vehicle communication connection information transmitted by the wide-area communication terminal 210. If the result of step S51 is NO, step S51 is repeated. If the result of step S51 is YES, the process proceeds to step S52 where an update time check for each terminal number of the connected terminal list is conducted. Then, in step S53, data of the terminal number which is not updated after the previous check is deleted from the connected terminal list.

FIG. 16 is a flow diagram of a resource assignment process performed by a wide-area communication resource management unit 103 of the base station 100. This process is performed in a regular cycle. In step S61, all the terminal numbers are read out from the connected terminal list. In step S62, the assignment determination is read out from the determination storage unit 105.

In step S63, the wide-area communication terminal 210 having the terminal number read out in step S61 is assigned to the resource block that is determined by the assignment determination read out in step S62. In step S64, the remaining resource blocks are assigned to the remaining wide-area communication terminals 210 located within the wide-area communication area 110. The assignment in step S64 can be performed by using various techniques known in the art, for example, assignment based on the received signal level. Further, in step S63, a plurality of terminals may be assigned by using the same technique as that of step S64. Accordingly, the wide-area communication resource assignment can be generated by the above processing. The generated wide-area communication resource assignment is transmitted as the wide-area communication resource information from the communication processing unit 102 to the wide-area communication terminal 210 of the mobile stations 200.

As described above, in the fourth embodiment, the wide-area communication terminal 210 in the connected state with the inter-vehicle communication device 220 is preferentially assigned to the portion of the wide-area communication resource assignment provided by the base station 100 which is determined based on the assignment determination. Further, the inter-vehicle communication device 220, when determining the dedicated short-range communication resource assignment, refers to the portion of the wide-area communication resource assignment obtained from the wide-area communication terminal 210 which is determined based on the assignment determination. Since the wide-area communication terminal 210 in the connected state with the inter-vehicle communication device 220 is assigned to this portion, it is possible to reduce a risk that an assignment of its own inter-vehicle communication device 220 does not exist in the dedicated short-range communication resource assignment.

According to the fourth embodiment, the communication control unit 213 of the wide-area communication terminal 210 transmits the inter-vehicle communication connection information in a regular cycle (S32, S33 in FIG. 13). As a consequence, in the base station 100, the wide-area communication resource assignment in which the wide-area communication terminal 210 in the connected state with the inter-vehicle communication device 220 is preferentially assigned to the portion thereof which is determined based on the assignment determination is updated in a regular cycle. Since the dedicated short-range communication resource assignment is determined by referring to the wide-area communication resource assignment, the inter-vehicle communication that uses the dedicated short-range communication resource assignment can also be performed in a periodic manner.

Further, according to the fourth embodiment, each time the inter-vehicle communication connection information is received, an additional update is performed on the connected terminal list that is managed by the connected terminal management unit 104 (FIG. 14). Further, a deletion processing is performed on the connected terminal list each time after a predetermined period of time has elapsed (FIG. 15). Consequently, the connected terminal list is periodically updated to reflect the wide-area communication terminal 210 in the connected state with the inter-vehicle communication device 220 that is actually located within the wide-area communication area 110. As a result, since the wide-area communication resource assignment is sequentially or periodically determined based on the connected terminal list, the wide-area communication terminal in the connected state with the inter-vehicle communication device 220 that is actually located within the wide-area communication area 110 is assigned to the portion of the wide-area communication resource assignment which is determined based on the assignment determination. Accordingly, in the inter-vehicle communication, a communication interval is prevented from increasing.

Fifth Embodiment

A fifth embodiment will be described below.

FIG. 17 is a block diagram which shows a configuration of the base station 100 in the fifth embodiment. The base station 100 in the fifth embodiment is the same as that in FIG. 10 in that it includes the base station wide-area communication antenna 101, the communication processing unit 102, the wide-area communication resource management unit 103, the connected terminal management unit 104 and the determination storage unit 105. In the fifth embodiment, the assignment determination stored in the determination storage unit 105 can be rewritten by an administrator of the base station 100. Further, the communication processing unit 102 has a function to obtain assignment information indicative of the assignment determination from the determination storage unit 105 and transmit the assignment information to the mobile station 200.

Figure 18:
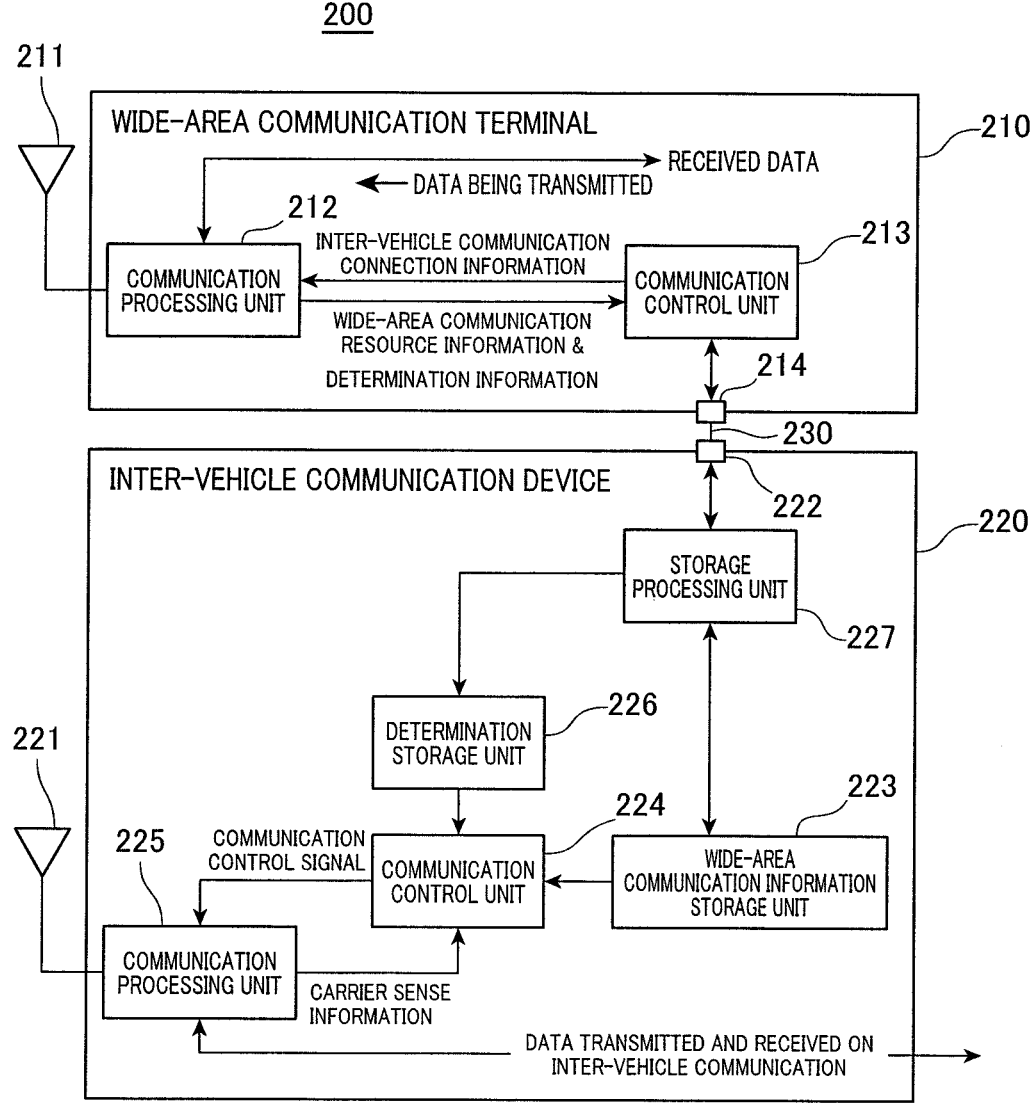
FIG. 18 is a block diagram which shows a configuration of the mobile station in the fifth embodiment.

FIG. 18 is a block diagram which shows a configuration of the mobile station 200 in the fifth embodiment. The mobile station 200 in the fifth embodiment also includes the wide-area communication terminal 210 and the inter-vehicle communication device 220. Similarly to that in FIG. 12, the wide-area communication terminal 210 includes the mobile station wide-area communication antenna 211, the communication processing unit 212 and the communication control unit 213. In the fifth embodiment, the communication processing unit 212 receives assignment information in addition to the wide-area communication resource information via the base station wide-area communication antenna 101. The communication control unit 212 also transmits the assignment information to the communication control unit 213. Then, the communication control unit 213 transmits the assignment information to the inter-vehicle communication device 220.

The inter-vehicle communication device 220 in the fifth embodiment is the same as that in FIG. 12 in that it includes the mobile station inter-vehicle communication antenna 221, the connector 222, the wide-area communication information storage unit 223, the communication control unit 224, the communication processing unit 225 and the determination storage unit 226. In the fifth embodiment, the determination storage unit 226 is configured to be rewritable. The inter-vehicle communication device 220 further includes a storage processing unit 227. When the information is transmitted from the wide-area communication terminal 210, the content of the information is analyzed by the storage processing unit 227. The wide-area communication resource information is stored in the wide-area communication information storage unit 223, and the assignment information is stored in the determination storage unit 226.

According to the fifth embodiment, although the assignment information stored in the determination storage unit 105 of the base station 100 and the assignment information stored in the determination storage unit 226 in the inter-vehicle communication device 220 are the same, those assignment information can be changed. Accordingly, the assignment information can be changed depending on various changes in situation.

Sixth Embodiment

A sixth embodiment will be described below.

FIGS. 19A and 19B are views which show a dedicated short-range communication resource assignment determined by the communication control unit 224 of the inter-vehicle communication device 220 in the sixth embodiment. In the sixth embodiment, the time slot 1 of the wide-area communication resource assignment is used to determine the dedicated short-range communication resource assignment, and then an update cycle is set at each N time slots. Accordingly, the time slot N+1 of the wide-area communication resource assignment is used for the next dedicated short-range communication resource assignment.

The length of one time slot in the dedicated short-range communication resource assignment is defined such that a plurality of dedicated short-range communication resource assignments can be contained in N time slots of the wide-area communication resource assignment. Until the next update cycle comes, the same dedicated short-range communication resource assignment is repeated.

Accordingly, the inter-vehicle communication device 220 can perform a plurality of data transmissions until the next update cycle comes.

Seventh Embodiment

A seventh embodiment will be described below.

FIGS. 20A and 20B are views which show a dedicated short-range communication resource assignment determined by the communication control unit 224 of the inter-vehicle communication device 220 in the seventh embodiment.

In the seventh embodiment, the dedicated short-range communication resource assignment is determined by fixing the frequency block of the wide-area communication resource assignment. Specifically, in the example of FIG. 20, the frequency block 4 of the wide-area communication resource assignment (FIG. 20A) is used. In the frequency block 4, the wide-area communication terminal 210B is assigned to the time slot 2, while the wide-area communication terminal 210D is assigned to the time slot 4.

In the dedicated short-range communication resource assignment (FIG. 20B) that is determined by referring to the wide-area communication resource assignment, the terminals B, D are assigned to the times corresponding to the time slots 2, 4 of the wide-area communication resource assignment, respectively.

According to the seventh embodiment, use of the frequency block 4 is stored in the determination storage unit 105, 226 as the assignment determination. The wide-area communication terminal 210 transmits the inter-vehicle communication connection information to the base station 100, and the base station 100 preferentially assigns the wide-area communication terminal 210 that has transmitted the inter-vehicle communication connection information to the frequency block 4 of the wide-area communication resource assignment.

Eighth Embodiment

An eighth embodiment will be described below.

FIGS. 21A and 21B are views which show a dedicated short-range communication resource assignment determined by the communication control unit 224 of the inter-vehicle communication device 220 in the eighth embodiment.

In the eighth embodiment, one wide-area communication terminal 210 is assigned to each time slot of the wide-area communication resource assignment. In the dedicated short-range communication resource assignment, the same time slot as that of the wide-area communication resource assignment is set by referring to the wide-area communication resource assignment, and accordingly, the same terminal as that is assigned in the wide-area communication resource assignment is assigned to each time slot.

Although the embodiments of the invention have been described above, the invention is not limited to the above described embodiments, and various modification can be made to the embodiments without departing from the principle of the invention.

What is claimed is:

1. An inter-vehicle communication system comprising:
    a base station communication device providing a communication area and being capable of performing wide area communication with wide-area communication terminals which are present in the communication area,
    the wide-area communication terminals being installed in a plurality of mobile station communication devices respectively communicably connected to wide-area communication terminals in the mobile station communication devices; and
    a plurality of inter-vehicle communication devices being installed in the mobile station communication devices respectively, the inter-vehicle communication devices performing short-range communication with each other using short-range communication resources different from wide-area communication resources of the wide-area communication,
    wherein: the base station communication device comprises a wide-area resource transmitting means for assigning the wide-area communication resources to a plurality of the wide-area communication terminals which are present in the communication area of the base station communication device and transmitting the wide-area communication resource assignment to the communication area;
    a wide-area communication terminal comprises notification means for notifying the inter-vehicle communication device which is communicable connected to the wide-area communication terminal, of the wide-area communication resource assignment received from the base station communication device; and
    the inter-vehicle communication device comprises
    assignment acquiring means for acquiring the wide-area communication resource assignment from the wide-area communication terminal,
    transmission timing deciding means for deciding a short-range communication resource assignment based on the acquired wide-area communication resource assignment, and
    data transmitting means for transmitting data based on a transmission timing defined by the short-range communication resource assignment, using the short-range communication,
    wherein
    the inter-vehicle communication device includes a determination storage unit that stores assignment information for determining a portion of the wide-area communication resource assignment to be referred to when deciding the short-range communication resource assignment, the transmission timing deciding means refers to the portion of the wide-area communication resource assignment acquired from the assignment acquiring means which is determined based on the assignment information and decides the short-range communication resource assignment, the wide-area communication terminal, when the wide-area communication terminal is in the connected state with the inter-vehicle communication device, sequentially or periodically transmits inter-vehicle communication connection information indicative of being in the connected state with the inter-vehicle communication device to the base station communication device, the base station communication device includes a base station storage unit that stores the same assignment information as that is stored in the determination storage unit of the inter-vehicle communication device, and a wide-area resource transmission control unit is configured to, when the inter-vehicle communication connection information is transmitted from the wide-area communication terminal, refer to the assignment information stored in the base station storage unit and sequentially or periodically determines the wide-area communication resource assignment having the wide-area communication terminal that has transmitted the inter-vehicle communication connection information assigned to the portion of the wide-area communication resource assignment which is determined based on the assignment information.

2. The inter-vehicle communication system according to claim 1, wherein the wide-area communication terminal is configured to transmit the inter-vehicle communication connection information in a regular cycle.

3. The inter-vehicle communication system according to claim 1, wherein the base station communication device has a connected terminal list that contains terminal identification information of the wide-area communication terminal that has transmitted the inter-vehicle communication connection information and an update time of the inter-vehicle communication connection information and includes a connected terminal management unit that manages the connected terminal list, the connected terminal management unit is configured to, when the connected terminal management unit receives the inter-vehicle communication connection information, update an update time that corresponds to the wide-area communication terminal if the terminal identification information of the wide-area communication terminal that has transmitted the inter-vehicle communication connection information is contained in the connected terminal list, adds the terminal identification information of the wide-area communication terminal to the connected terminal list if the terminal identification information of the wide-area communication terminal that has transmitted the inter-vehicle communication connection information is not contained in the connected terminal list, and deletes the terminal identification information of the wide-area communication terminal that corresponds to the update time from the connected terminal list if the update time in the connected terminal list is not updated for a predetermined period of time or longer, and the wide-area resource transmitting means sequentially or periodically determines the wide-area communication resource assignment having the wide-area communication terminal whose terminal identification information is contained in the connected terminal list assigned to the portion of the wide-area communication resource assignment which is determined based on the assignment information.

4. The inter-vehicle communication system according to claim 1, wherein the assignment information stored in the base station storage unit can be rewritten by user operation, the base station communication device transmits the assignment information stored in the base station storage unit to the mobile station communication devices, the wide-area communication terminal of the mobile station communication devices includes an assignment information providing unit that provides the assignment information to the inter-vehicle communication device in the connected state with the wide-area communication terminal when the wide-area communication terminal receives the assignment information from the base station communication device, and the inter-vehicle communication device includes a storage processing unit that processes the assignment information when the assignment information is provided from the wide-area communication terminal so that the assignment information is stored in the determination storage unit.

5. The inter-vehicle communication system according to claim 2, wherein the base station communication device has a connected terminal list that contains terminal identification information of the wide-area communication terminal that has transmitted the inter-vehicle communication connection information and an update time of the inter-vehicle communication connection information and includes a connected terminal management unit that manages the connected terminal list, the connected terminal management unit is configured to, when the connected terminal management unit receives the inter-vehicle communication connection information, update an update time that corresponds to the wide-area communication terminal if the terminal identification information of the wide-area communication terminal that has transmitted the inter-vehicle communication connection information is contained in the connected terminal list, adds the terminal identification information of the wide-area communication terminal to the connected terminal list if the terminal identification information of the wide-area communication terminal that has transmitted the inter-vehicle communication connection information is not contained in the connected terminal list, and deletes the terminal identification information of the wide-area communication terminal that corresponds to the update time from the connected terminal list if the update time in the connected terminal list is not updated for a predetermined period of time or longer, and the wide-area resource transmitting means sequentially or periodically determines the wide-area communication resource assignment having the wide-area communication terminal whose terminal identification information is contained in the connected terminal list assigned to the portion of the wide-area communication resource assignment which is determined based on the assignment information.

6. The inter-vehicle communication system according to claim 5, wherein the assignment information stored in the base station storage unit can be rewritten by user operation, the base station communication device transmits the assignment information stored in the base station storage unit to the mobile station communication devices, the wide-area communication terminal of the mobile station communication devices includes an assignment information providing unit that provides the assignment information to the inter-vehicle communication device in the connected state with the wide-area communication terminal when the wide-area communication terminal receives the assignment information from the base station communication device, and the inter-vehicle communication device includes a storage processing unit that processes the assignment information when the assignment information is provided from the wide-area communication terminal so that the assignment information is stored in the determination storage unit.

* * * * *